Figure 1:
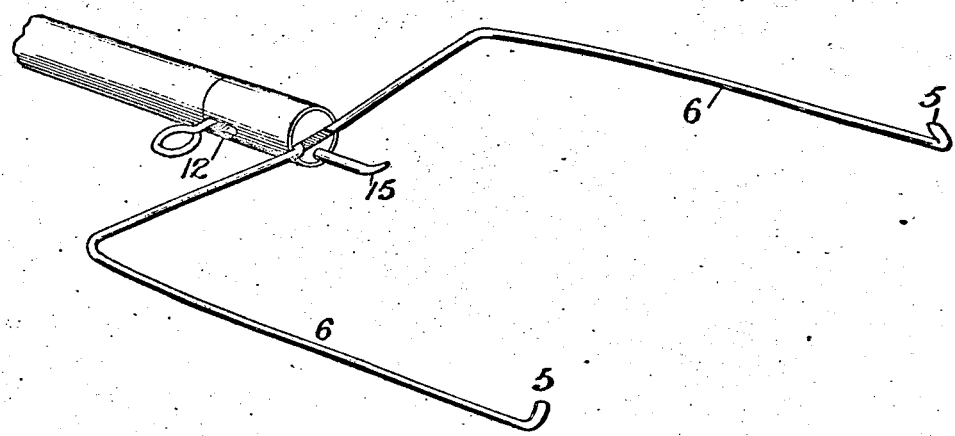

No. 895,334. PATENTED AUG. 4, 1908.
R. BROOKS.
PLATE HANDLER.
APPLICATION FILED SEPT. 27, 1907.

WITNESSES
James P. Duhamel.
Geo. Ackman Jr.

INVENTOR,
Raymond Brooks,
BY
Victor J. Evans
ATTORNEY

UNITED STATES PATENT OFFICE.

RAYMOND BROOKS, OF ASHUELOT, NEW HAMPSHIRE.

PLATE-HANDLER.

No. 895,334.  Specification of Letters Patent.  Patented Aug. 4, 1908.

Application filed September 27, 1907. Serial No. 394,859.

*To all whom it may concern:*

Be it known that I, RAYMOND BROOKS, a citizen of the United States, residing at Ashuelot, in the county of Cheshire and State of New Hampshire, have invented new and useful Improvements in Plate-Handlers, of which the following is a specification.

This invention relates to plate handlers and is especially adapted for use in handling warm plates containing articles which have been cooked and is intended to either remove the plate from the stove or deposit same within the oven as will be more fully explained in the following specification, set forth in the claims and illustrated in the drawings.

Figure 2:
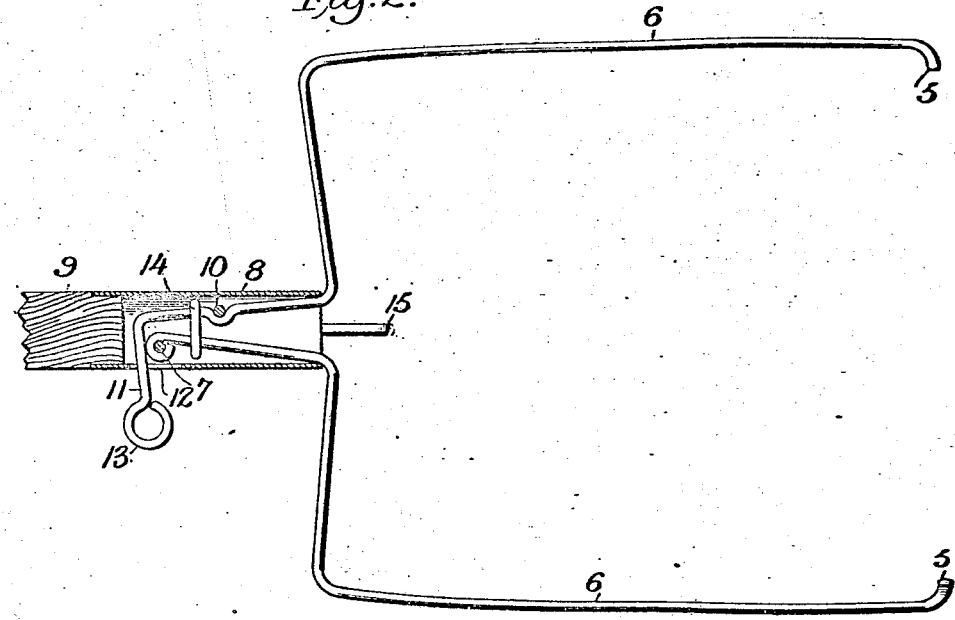

Figure 1 is a perspective view of the improved device. Fig. 2 is a plan view of the same with its handle in section.

The device is a fork having prongs at its end which are adapted to engage the plate when it is desired to remove same from the stove or deposit the same therein. The prongs 5 are at the outer ends of arms 6 one of which is pivoted at 7 within a ferrule 8 at the end of the handle 9 and is adapted to swing on this pivot. The coöperating arm is also pivoted or held in place by a pin 10 and its end is turned at a right angle to form a stem 11 which extends through a slot 12 to the outside of the handle where it is easily manipulated. The outer end of the stem 11 is formed with an eye 13 in which the finger of the party using the device may be placed so as to swing the arms 6 on their respective pivots to engage or disengage the plate.

In order to secure coöperation in the movement of the arms they are united by means of the link 14 near their pivots so that when the eye 13 is pressed inward forcing back the stem 11 inward it also causes the arm 6 on that stem to move inward carrying with it the link 14 and consequently drawing in the other arm of the device.

In order to prevent the plate from tipping when caught by the two arms the handle is provided with a lip 15 which also is intended to fit beneath the rim of the plate.

In the operation of this plate holder the arms are brought together beneath the rim of the plate after they are pushed far enough under the same for the lip 15 to also engage the rim and the three members are sufficient to support the plate and handle it while in this position.

To release the plate the stem 11 is simply pulled outward or the eye shoved forward and this causes the two arms to spread beyond the rim of the plate.

This construction provides for a very simple device which is inexpensive and very effective in its operation.

What I claim as new and desire to secure by Letters Patent is:

1. In a plate handler, the combination of a handle carrying a ferrule having a slot, of jaws pivoted in the ferrule, one of said jaws having one end turned at right angles thereto to form a stem, said stem projecting through the slot in the ferrule, a handle eye formed on the end of said stem, and connections between said jaws for causing the same to move to open or closed position simultaneously.

2. In a plate handler, the combination of a handle carrying a ferrule having a slot, of jaws pivoted in the ferrule, one of said jaws having one end turned at right angles thereto to form a stem, said stem projecting through the slot in the ferrule, and a link uniting the jaws for causing the same to move to open or closed position simultaneously.

In testimony whereof, I affix my signature in presence of witnesses.

RAYMOND BROOKS.

Witnesses:
E. F. QUALTERS,
F. L. DETOUR,
J. EUGENE FELCH,
F. A. RUTZELL.